United States Patent [19]

Maya

[11] Patent Number: 5,024,739
[45] Date of Patent: Jun. 18, 1991

[54] NOVEL HYBRID ISOTOPE SEPARATION SCHEME AND APPARATUS

[75] Inventor: Jakob Maya, Brookline, Mass.

[73] Assignee: GTE Products Corporation, Danvers, Mass.

[21] Appl. No.: 323,920

[22] Filed: Mar. 15, 1989

[51] Int. Cl.$^5$ .............................................. B01D 5/00
[52] U.S. Cl. ............................ 204/157.2; 204/657.21; 204/157.22; 204/DIG. 11; 250/423 P; 55/2; 55/17; 494/43; 494/902
[58] Field of Search ........... 204/157.2, 157.21, 157.22, 204/11; 250/423 P; 55/2, 17; 494/43, 902

[56] References Cited

U.S. PATENT DOCUMENTS

| | | |
|---|---|---|
| 2,713,025 | 7/1955 | Billings . |
| 3,673,406 | 6/1972 | Wief et al. . |
| 3,774,376 | 11/1973 | Takashima et al. ................... 55/407 |
| 3,915,673 | 10/1975 | Tamai et al. .............................. 55/17 |
| 3,983,019 | 9/1976 | Botter nee Bergheaud et al. . |
| 3,996,120 | 12/1976 | Freund et al. . |
| 3,998,610 | 12/1976 | Leith ....................................... 55/17 |
| 4,090,855 | 5/1978 | Hara et al. ................................ 55/2 |
| 4,096,046 | 6/1978 | Niemann . |
| 4,235,612 | 11/1980 | Gazda ................................... 55/403 |
| 4,255,404 | 3/1981 | Chen .................................. 423/258 |
| 4,265,648 | 5/1981 | Wedege ................................. 55/409 |
| 4,285,701 | 8/1981 | Schlenker .............................. 55/17 |
| 4,373,941 | 2/1983 | Lagelbauer ........................... 55/401 |
| 4,516,966 | 5/1985 | Alderton et al. ....................... 55/17 |

FOREIGN PATENT DOCUMENTS

| | | |
|---|---|---|
| 0064596 | 5/1977 | Japan . |
| 0064597 | 5/1977 | Japan . |
| 0064598 | 5/1977 | Japan . |
| 0037969 | 3/1979 | Japan . |

OTHER PUBLICATIONS

Donald R. Olander, "The Gas Centrifuge", (Scientific American, vol. 239, No. 2, Aug. 1978).

*Primary Examiner*—Stephen J. Lechert, Jr.
*Assistant Examiner*—Ngoclan T. Mai
*Attorney, Agent, or Firm*—Martha Ann Finnegan

[57] ABSTRACT

A method of yielding selectively a desired enrichment in a specific isotope including the steps of inputting into a spinning chamber a gas from which the specific isotope is to be isolated, radiating the gas with frequencies characteristic of the absorption of a particular isotope of the atomic or molecular gas, thereby inducing a photoionization reaction of the desired isotope, and collecting the specific isotope ion by suitable ion collection means.

21 Claims, 3 Drawing Sheets

NOVEL HYBRID ISOTOPE SEPARATION SCHEME AND APPARATUS

The Government has rights in this invention pursuant to subcontract 4540710 under Prime Contract DE-AC03-76SF00098 awarded by the United States Department of Energy.

BACKGROUND OF THE INVENTION

1. Field of the Invention

The present invention relates to the separation of isotopes from a gaseous mixture by means of a rotary chamber such as, for example, a centrifuge reactor having means therein to radiate the gaseous mixture with frequencies characteristic of the absorption and ionization of a particular isotope of the atomic or molecular gaseous mixture so as to ionize the desired isotope.

2. Description of the Prior Art

The separation of isotopes by spinning highly volatile gas at fairly high speeds is known. Such separation is known in the art as the gas-centrifuge method. In the typical centrifuge reactor a gaseous compound is subjected to spinning at very high rotational speeds within a cylindrical rotor, causing the gas particles containing the heavier isotope to be thrust against the wall of the rotor. In particular, the rotation of the rotor drives the gas radially against the wall of the rotor such that a substantial portion of the center of the cylinder is under vacuum or close to it, even though no pump is employed. The gas particles tend to concentrate at the peripheral wall of the rotor. A weak vertical circulation is effected by, for example, providing a bottom scoop within the rotor which functions in combination with temperature differences at the top and bottom caps for the rotor to cause vertically axial movement of the gas at the peripheral wall of the rotor, in a known manner. A top scoop is also provided to scoop the desired particles.

The foregoing type of centrifuge reactor is well known in the art. Representative of such a reactor is discussed in an article entitled "The Gas Centrifuge" by Donald R. Olander, (*Scientific American*, Volume 239, No. 2, August 1978). The reactor discussed in the Olander article is particularly useful in enrichment by increasing the concentration of one isotope relative to another. The use of such a reactor is very economical, a large separation factor and sufficient throughput being provided. However, the scoop provided in a typical centrifuge reactor is of a finite size which means that it is usually not possible to scoop a single isotope from a distribution of isotopes that are enriched. Therefore, regardless of the favorable economics, in applications where only one of several isotopes is needed, centrifugal reactors heretofore in use have not been particularly useful.

Another known means for the separation of isotopes involves photochemical separation. Examples of photochemical separation can be found in U.S. Pat. Nos. 2,713,025 to Billings; 3,673,406 to Wief et al.; 3,983,019 to Botter nee Bergheaud et al.; 3,996,120 to Freund et al.; and 4,096,046 to Niemann. These patents are of interest in that they describe various apparatuses and methods for use in photochemical isotope separation using one form or another of a lamp for irradiation of a gas stream to effect the separation. The photochemical isotope separation process is known to be useful in those instances where photons from a particular radiation source excite only one isotope. The apparatus used in such a process is useful in obtaining a single isotope from a distribution of isotopes without substantially altering the composition of the other isotopes in the distribution. One disadvantage of such photochemical isotope separation is that due to deposits containing enriched material, eventually the entry window for the photons becomes foggy unless some means is provided to prevent such a buildup. A similar fogginess results from the use of a lamp if the envelope of the lamp is in contact with the chemical during the photochemical separation process. When the lamp envelope or entry window becomes foggy, it is necessary to stop the reactor or activate some form of scraper or the like to clean the envelope or window.

It is highly desirable to obtain a single isotope from a distribution of isotopes that are enriched. It is further desirable to provide a photochemical isotope separator which can be used to obtain a single isotope from a distribution of isotopes that are enriched, without causing anywhere in the apparatus a buildup of enriched material which might impede radiation.

SUMMARY OF THE INVENTION

The invention achieves these and other results by providing a method of yielding selectively a desired enrichment in a specific isotope comprising the steps of (a) inputting into a rotatable chamber a gaseous mixture including the specific isotope; (b) spinning the chamber and the gaseous mixture therein; (c) radiating the spinning gaseous mixture with frequencies characteristic of the absorption and ionization of a particular isotope of the atomic or molecular gaseous mixture, thereby ionizing the desired isotope, and (d) collecting the ionized desired isotope from the spinning and radiated gaseous mixture.

DESCRIPTION OF THE PREFERRED EMBODIMENT

Figure 1:
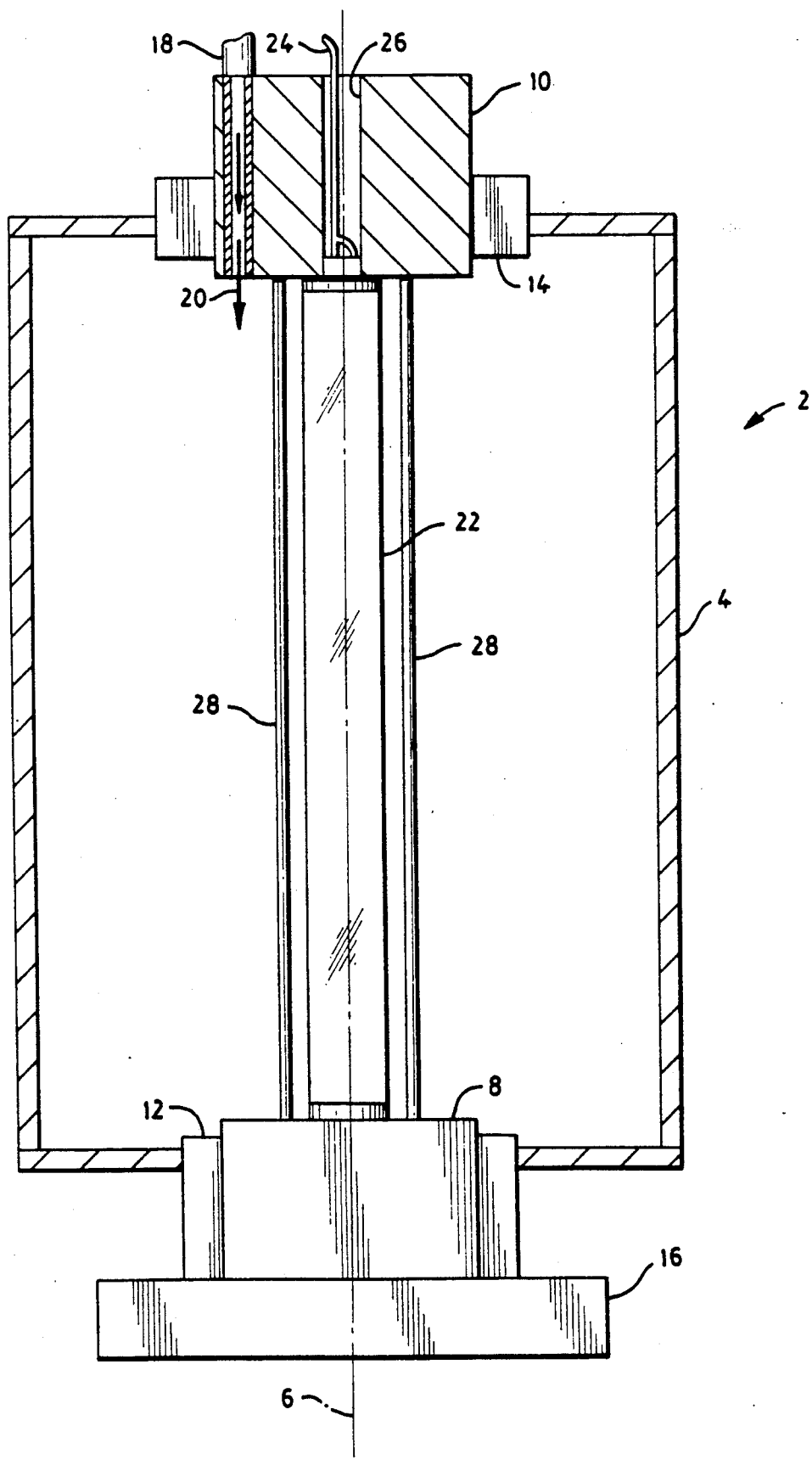
FIG. 1 is an elevational view of one embodiment of a photoionization isotope separator of the present invention.

The embodiment which is illustrated in FIG. 1 is particularly suited for achieving the objects of this invention. FIG. 1 depicts a photoionization isotope separator 2. The separator 2 includes a chamber 4 which in the preferred embodiment is a cylindrical chamber. Chamber 4 has a longitudinal axis 6 about which the chamber can be rotated in a known manner. In particular, means is coupled to the chamber for spinning it at a high speed about axis 6. Such spinning means is known in the art relating to gas centrifuges and is therefore not discussed in detail herein. However, such spinning means is diagrammatically depicted in FIG. 1 as including supporting hubs 8 and 10 which are associated with magnetic bearings 12 and 14, hub 8 being supported by an electromagnetic motor 16 and hub 10 being supported by appropriate structure not depicted in the drawing. In the embodiment of FIG. 1, hubs 8 and 10 are stationary, although it is possible to provide a centrifuge wherein such hubs rotate with the chamber. Upon activation, electromagnetic motor 16 causes the chamber 4 to rotate at a high speed about hubs 8 and 10 and axis 6.

Means is provided for causing gas to flow into chamber 4. In particular, in the embodiment of FIG. 1 a conduit 18 extends through hub 10 such that gas supplied from a source (not depicted) will flow in the direction of arrows 20 into the chamber 4. The gas fed into the chamber 4 through conduit 18 is a gas from which a specific isotope is to be isolated as described herein. Such gas will be caused to spin as a result of the spinning of the chamber 4.

Figure 2:
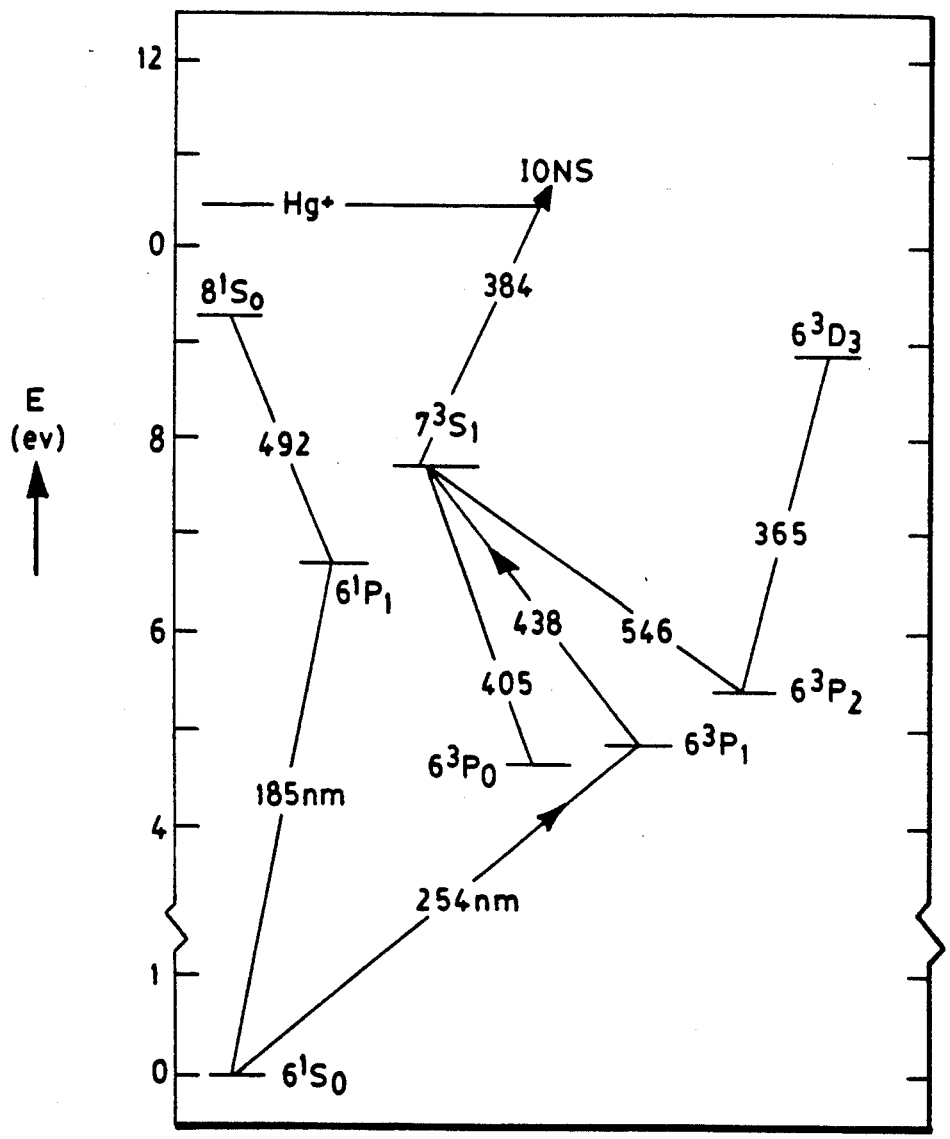
FIG. 2 schematically illustrates the ionization energies (eV) and radiation (nm) associated with ionization of $^{196}Hg$.

Means is mounted within the chamber for radiating the spinning gas with frequencies characteristic of the absorption and ionization of a particular isotope of the atomic or molecular gaseous mixture. Without limitation, examples of such radiating means include a laser, an isotopically selective lamp, and the like. In the embodiment of FIG. 1, radiating means is depicted as a lamp 22 which is isotopically selective; however, one or more lamps may be used in a particular separation scheme. Preferably, the lamp or lamps are each optimized to emit at the frequencies characteristic of the absorption and ionization of a particular isotope of the atomic or molecular gaseous mixture, which, for $Hg^{196}$, are 254, 384, and 438 nm. The lamp 22 is an elongated fluorescent lamp which extends along axis 6 and is fastened at a respective end to hubs 8 and 10 using any known mounting means for such tubular lamps. Current is provided to lamp 22 by means of a conductor 24 which extends through a bore 26 provided in hub 10. Preferably, the lamp or lamps are isotopically enriched and filtered fluorescent lamps which when activated emit radiation such as, for example, primary $^{196}Hg$ radiation and the other necessary wavelengths, e.g., 438 nm and about 385.0 nm to take $^{196}Hg$ to the ionic state as shown in FIG. 2.

Means is mounted within chamber 4 for collecting the specific isotope obtained by spinning the desired gas at a high speed in the presence of radiation as discussed herein. In the embodiment of FIG. 1 such collecting means is positioned between the outer periphery of the chamber and the lamp and includes at least one ion collection member. (The ion collection members are electrically biased.) Without limitation, examples of such an ion collection member include elongated rods, a wire cylindrical mesh, and the like. In the embodiment of FIG. 1, the ion collection member is in the form of rods 28. Two ion collection rods 28 are depicted in FIG. 1, although a plurality of rods circumferentially spaced and extending about axis 6 is preferred. Use of ion collection rods is known in the art and will not be described herein. Rods 28 are spaced from lamp 22 and extend along respective axes which are parallel to axis 6. The rods 28 are coupled to hubs 8 and 10 using any means which will hold the rods in place during operation of the separator 2. Rods 28 spaced from lamp 22 are particularly useful in collecting lighter isotopes, since it is the lighter isotopes which will tend to be suspended in an area between inner surface 30 or the periphery of the chamber and the lamp during operation of the separator 2.

Figure 3:
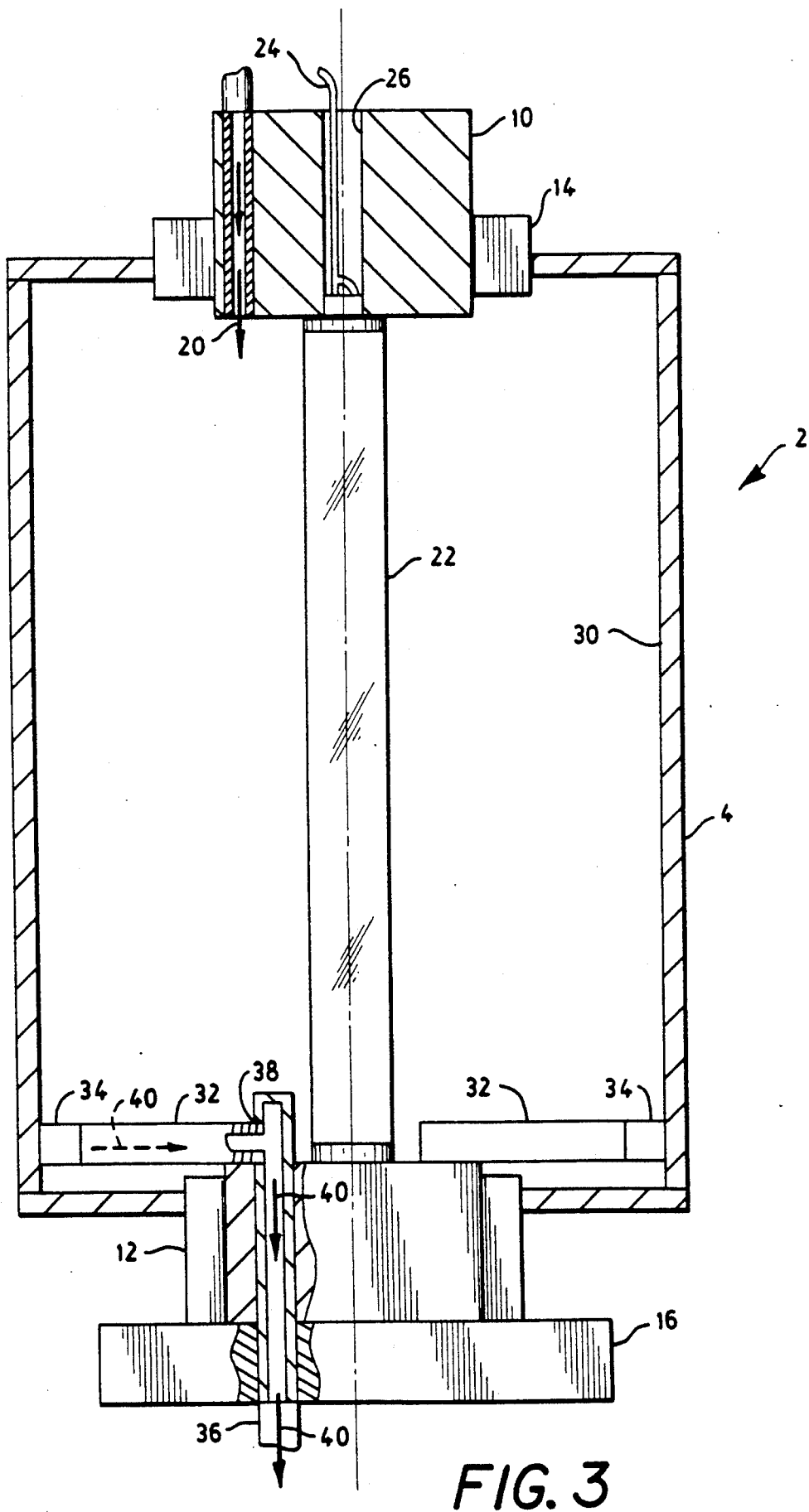
FIG. 3 is an elevational view of an alternative embodiment of photoionization isotope separator of the present invention.

In those instances where it is desired to collect heavier isotopes which tend to be spun outward to the inside wall of the periphery of the chamber during the spinning thereof and then fall towards the bottom of the chamber, the apparatus depicted in FIG. 3 is provided.

FIG. 3 depicts a separator identical to the separator of FIG. 1, similar structure having the same reference numbers, with the exception that ion collection rods 28 have been replaced with collecting means positioned adjacent to an inner wall 30 of the chamber 2. In particular, in the embodiment of FIG. 3, the collecting means is in the form of at least one scooping member 32. The centrifuge discussed in the Olander article referred to herein describes such scooping members and such members will not be discussed further herein except to note that the scooping members 32 are hollow and include nozzle-like scoops 34 at the end thereof adjacent inner wall 30. Scoops 34 scoop-up the heavier isotope containing compounds which have been flung towards inner wall 30, by the centrifugal force effected as the chamber 4 is caused to spin, and then fall to the bottom of the chamber. In essence, the heavier isotopes lying against wall 30 are scraped therefrom by scoops 34. As is known in the art, the isotopes can also be caused to flow towards the top of the chamber 4 in which case scoops can be positioned accordingly. Alternatively, elongated scoops extending in the vertical direction of axis 6 from the upper wall to the lower wall of the chamber 4 can be positioned against the inside wall 30 to scoop or otherwise scrape isotopes from the entire extent of the wall 30.

Means can be provided to remove the collected specific isotope from the chamber 4. For example, in the embodiment of FIG. 3 a conduit 36 is provided which connects with the bore 38 extending through the hollow scooping member 32, so that as the heavier isotopes are collected by the scoops 34, such heavier isotopes are caused to flow in the direction of arrows 40 through bore 38 and out of the chamber 4 by means of conduit 36 for collection as desired.

In the method of the present invention, and referring to FIG. 1, a suitable gas from which the specific isotope is to be isolated is caused to flow from a source (not shown) through conduit 8 and into the rotatable chamber 4. For example, if it is desired to ultimately collect $^{196}Hg$, natural mercury is inputted through conduit 18 into chamber 4. Chamber 4 and the gaseous mixture therein is spun at a very high speed by the electromagnetic motor 16, thereby causing the heavier isotopes to be projected towards the inner wall 30 of the periphery of the chamber and the lighter isotopes to be maintained in an area between inner wall 30 and the lamp 22. During the spinning of the gaseous mixture, it is radiated with wave lengths or frequencies characteristic of the absorption and ionization of a particular isotope of the atomic or molecular mixture. To this end, one or more isotopically selective lamps are used, such as an isotopically enriched and filtered fluorescent lamp which emits radiation such as primary $^{196}Hg$ radiation and radiation of wavelength 404 nm and other infrared radiation to fully ionize the specific isotope in several steps. The manner in which collecting of the specific isotope from the spinning and radiated gas is effected depends upon whether it is desired to collect the lighter or heavier isotope. If collecting the lighter isotope, such collecting is done as noted above in an area between the inner wall 30 and the lamp 22. In collecting the heavier isotope, such collecting is done as noted above by scooping the specific isotope at the inner wall 30 of the chamber 4. The collected isotope can be removed from chamber 30 in several ways. For example, as described above, removing can be effected by causing the scooped ionized isotopes (once they are charge neutralized by, for example, electrons), to flow through bore 38 and conduit 36 of FIG. 3, to a suitable chamber. Alternatively, if rods are used, or if some other ion collection member is used such as, for example, a cylindrical wire mesh which extends circumferentially about axis 6 and lamp 22, the isotopes can be removed in a known manner by first removing the rods or mesh or the like, as the case may be, from the chamber 4, and then cleaning such member(s) by, for example, submerging into a dissolving solution to remove the specifically collected isotopes from the surface of the collection member. Without intending to be bound by a theory of operation, and considering by way of example only the enrichment of $^{196}Hg$ by flowing a gaseous mixture of natural Hg into a chamber 4, in the process of the present invention the heavy isotopes will be concentrated next to the inner wall of the chamber and the lighter isotopes will be somewhat away from the inner wall. To increase the enrichment of $^{196}Hg$, the pressure of the Hg can be increased in a known manner to the level where $^{196}Hg$ becomes optically thick, and this can be done without concern that other isotopes might also be excited, thereby causing scrambling due to energy transfer.

It is desirable to have the ion collection members close to where the ions are formed. This is because if ions have to travel a long distance before they are collected, they may encounter another undesired isotope and transfer the electrical charge, thereby diluting the enrichment process. Such charge transfer processes are well known in the literature and the probability of such charge-transfer processes occuring can be calculated. This probability can be substantially reduced by making the distance between the desired isotopic ion and the ion collection member as short as possible, e.g., on the order of the mean free path of the desired ion.

In using the method and apparatus of the present invention, it is possible to obtain a single isotope from a distribution of isotopes that are enriched. It is possible to do so by using a photoionization isotope separator without causing anywhere in the apparatus a buildup of enriched material which might impede radiation. The entire reaction can be accomplished in a single chamber, since there is no need to separate the chemicals from the lamp or other source of radiation. By keeping the lamp clean, the separator can be operated for an extended length of time and yet yield selectively a desired enrichment in a given isotope. In essence, the apparatus and method of the present invention make use of the advantages of photon selectivity of the photoionization and spatial selectivity of the centrifuge system, thereby significantly enhancing the isotope enrichment process while enabling the system to operate for long periods of time.

The embodiments which have been described herein are but some of several which utilize this invention and are set forth here by way of illustration, but not of limitation. It is apparent that many other embodiments which will be readily apparent to those skilled in the art may be made without departing materially from the spirit and scope of this invention.

What is claimed is:

1. A method of yielding selectively a desired enrichment in a specific isotope comprising the steps of:
inputting into a rotatable chamber a gaseous mixture including said specific isotope;
spinning said chamber and said gaseous mixture therein;
radiating said spinning gaseous mixture with frequencies characteristic of the absorption and ionization of said specific isotope of the atomic or molecular gas in said gaseous mixture, thereby ionizing the specific isotope and
collecting the ionized specific isotope from said spinning and radiated gaseous mixture.

2. The method of claim 1 wherein said radiating step includes radiating from one or more isotopically selected lamp.

3. The method of claim 2 wherein said collecting step includes collecting said specific isotope in an area between said lamp and an inner wall of the periphery of said rotatable chamber.

4. The method of claim 1 wherein said collecting step includes scraping said specific isotope off an ion collecting member.

5. The method of claim 1 wherein said inputting step includes inputting a gaseous mixture of natural mercury.

6. The method of claim 5 wherein said radiating step includes radiating said spinning gas from several isotopically enriched and filtered fluorescent lamps emitting radiation selected to ionize said specific isotope. This could be done either in one step or in a multiplicity of steps utilizing several frequencies.

7. The method of claim 6 wherein said lamps are emitting primarily $^{196}Hg$ radiation.

8. The method of claim 1 further including the step of removing the collected isotope from said chamber.

9. The method of claim 7 wherein said collecting step includes collecting said specific isotope in an area between said lamp and an inner wall of the periphery of said rotatable chamber.

10. A photoionization isotope separator for yielding selectively a desired enrichment in a specific isotope, comprising:
a chamber which is rotatable about a longitudinal axis;
means coupled to said chamber for spinning said chamber about said chamber;
means mounted within said chamber for radiating said spinning a gaseous mixture with frequencies characteristic of the absorption and ionization of a particular isotope of the atomic or molecular gas in said gaseous mixture; and
means mounted within said chamber for collecting specific isotope.

11. The photoionization isotope separator of claim 10 wherein said radiating means includes a lamp which is isotopically selective.

12. The photoionization isotope separator of claim 11 wherein said lamp is elongated and extends along a longitudinal axis.

13. The photoionization isotope separator of claim 10 wherein said chamber is cylindrical.

14. The photoionization isotope separator of claim 12 wherein said collecting means is positioned in an area between said lamp and an inner wall of the periphery of said rotatable chamber.

15. The photoionization isotope separator of claim 14 wherein said collecting means includes at least one ion collection member.

16. The photoionization isotope separator of claim 10 wherein said collecting means is positioned adjacent an inner wall of the periphery of said rotatable chamber.

17. The photoionization isotope separator of claim 16 wherein said collecting means includes at least one scooping member.

18. The photoionization isotope separator of claim 17 further including means associated with said at least one scooping member for removing said specific isotope from said chamber.

19. The photoionization isotope separator of claim 10 further including means associated with said collecting means for removing said specific isotope from said chamber.

20. The photoionization isotope separator of claim 11 wherein said lamps are isotopically enriched and filtered fluorescent lamps which emit radiation.

21. The photoionization isotope of claim 20 wherein said lamp emits primary $^{196}$Hg radiation of different wavelengths or a multitude of lamps each of which is optimized to emit 253.7 nm 438 nm, and 384 nm radiation necesary to ionize $^{196}$Hg.

* * * * *